United States Patent
Dawson

(10) Patent No.: US 7,051,112 B2
(45) Date of Patent: May 23, 2006

(54) SYSTEM AND METHOD FOR DISTRIBUTION OF SOFTWARE

(75) Inventor: Christopher Byron Dawson, Winchester (CA)

(73) Assignee: Tropic Networks Inc., Kanata, Ontario (CA)

( * ) Notice: Subject to any disclaimer, the term of this patent is extended or adjusted under 35 U.S.C. 154(b) by 845 days.

(21) Appl. No.: 09/967,950

(22) Filed: Oct. 2, 2001

(65) Prior Publication Data

US 2003/0065808 A1   Apr. 3, 2003

(51) Int. Cl.
G06F 15/16   (2006.01)

(52) U.S. Cl. ............ 709/232; 709/231; 709/233; 709/223; 709/225; 717/176; 717/177; 717/178

(58) Field of Classification Search ......... 709/232, 709/234, 217, 201, 233, 237; 717/167, 168, 717/169; 370/230, 235
See application file for complete search history.

(56) References Cited

U.S. PATENT DOCUMENTS

| | | | | |
|---|---|---|---|---|
| 5,572,645 A | * | 11/1996 | Dan et al. ............ | 345/501 |
| 5,689,640 A | | 11/1997 | Okanoue | |
| 5,878,220 A | * | 3/1999 | Olkin et al. .......... | 709/217 |
| 5,978,375 A | | 11/1999 | Petersen et al. | |
| 6,151,696 A | * | 11/2000 | Miller et al. ......... | 714/748 |
| 6,205,445 B1 | | 3/2001 | Tokuyama | |
| 6,289,012 B1 | * | 9/2001 | Harrington et al. ... | 370/389 |
| 6,359,894 B1 | * | 3/2002 | Hong et al. .......... | 370/402 |
| 6,434,606 B1 | * | 8/2002 | Borella et al. ........ | 709/214 |
| 2002/0138640 A1 | * | 9/2002 | Raz et al. ............ | 709/231 |
| 2002/0178330 A1 | * | 11/2002 | Schblowsky-Fischer et al. | 711/133 |

OTHER PUBLICATIONS

Lucent Technologies, "Asynchronous and Adaptive Incremental Redundancy Proposal for HSDPA", TSG-RAN Working Group1, Nov. 21-24, 2000.*
Internet RFC/STD/FYI/BCP Archives, RFC2090 "TFTP Multicast Option" A. Emberson, Lanworks Technologies Inc., Feb. 1997.

* cited by examiner

Primary Examiner—Bunjoe Jaroenchonwanit
Assistant Examiner—Dohm Chankong
(74) Attorney, Agent, or Firm—Victoria Donnelly

(57) ABSTRACT

The invention describes a system for distributing a software file from a source to a plurality of targets in such a manner that only portion of the file is received and stored in a file distributor. The file distributor has a flow mediator, which provides data flow control in such a manner that the stored portion of the file is forwarded to the targets asynchronously in order to provide that each target receives the portion of the file at its own rate. A corresponding method for the distribution of software is also provided.

10 Claims, 11 Drawing Sheets

SYSTEM AND METHOD FOR DISTRIBUTION OF SOFTWARE

FIELD OF THE INVENTION

The invention relates to electronic distribution of computer software, and in particular, to the distribution of the same software to multiple targets.

BACKGROUND OF THE INVENTION

Electronic distribution of computer software files is required in large systems having different modules, where each module has one or more targets (central processing units, or CPUs) for receiving a copy of the software file. One example of such a system is a telecommunications switch with many input/output port modules, each having a CPU.

It is conventional in such systems to keep the original copy of the software on a file server, which typically has a hard disk and a file storage control system. It is further customary in systems comprising many modules to designate one or more modules as system controllers. Each system controller is responsible for a number of subtending modules. One of the functions of a system controller is the distribution of software data to the CPUs in the subtending modules.

FIG. 1 illustrates a high-level view of a file distribution system 1 according to the prior art. It includes a file server 5 and a destination system 10, including a system controller 15 and a plurality of subtending modules 20, e.g. port cards, having targets (CPUs) 25. The system controller includes a file distributor 30, which optionally has a storage medium 35. The file distributor 30 is connected to each of the CPUs 25 over an interconnect system 40 having destination links 45, the examples of the interconnect system including a bus system or an electronic system which comprises a switching fabric as is conventional in telecommunications switches.

The file server 5 may be connected to the file distributor 30 over a direct transmission link 50, e.g. cable or telephone link. Alternatively, if the file server 5 is geographically remote from the destination system 10, the connection between the file server 5 and the file distributor 30 may be extended via a link through a network 55. It is customary in such cases to transmit the software files to be distributed as a series of packets. In this case the network 55 is a packet network where the transmission of data from the file server 5 to the file distributor 30 is performed by using a conventional packet transmission protocol, e.g. File Transfer Protocol (FTP) or Trivial File Transfer Protocol (TFTP).

There are several known approaches to the distribution of software in the system shown in FIG. 1.

In the first approach, the file is distributed from the file server 5 to the CPUs 25 in two stages according to a store-and-forward method. In the first stage of the method, the file to be distributed is transmitted from the file server 5 to the file distributor 30 over the link 50 or over the network 55 by using a standard file transfer protocol. The file is stored temporarily in the storage memory 135 associated with the file distributor 30, wherein the size of the memory is equal to or exceeds the size of the transferred file. In the second stage, copies of the file stored in the memory 35 are forwarded to each of the CPUs 25 over an interconnect system 40 by using a protocol adapted to the operation of the destination system 10.

The distribution systems using the first approach are disclosed, e.g. in U.S. Pat. No. 5,689,640 to Okanue entitled "Method and system for downloading data to network nodes", and in U.S. Pat. No. 6,205,445 to Tokuyama entitled "File distribution system and method thereof".

A major disadvantage of the above-mentioned systems, which use the store-and-forward method, is the need to provide sufficient storage memory at the file distributor to hold a copy of the largest file. As the computer systems evolve, and the targets become more powerful, they will require more sophisticated software, typically resulting in larger program and data files. As a result, this requirement creates either a need for an upgrade of the file distributor to keep pace with the larger files, or imposes a limitation on the maximum size of the files capable of being stored in the file distributor. In any event, it puts an undue limitation on the system and/or the process of the file transfer.

In another approach, the file distributor has no storage memory available to store the file or files to be distributed. Instead, it is a simple multiplexer as described, e.g. in U.S. Pat. No. 5,978,376 to Godse, entitled "Providing access to a distributed data processing system". In this system, both the link 55 between the file server 5 and the file distributor 30 ("cell multiplexer" in U.S. Pat. No. 5,978,376), and the interconnect system 40 between the file distributor 30 and the CPUs 25 ("devices" in U.S. Pat. No. 5,978,376), including destination links 45, employ the ATM protocol. Furthermore, both link 55 and the links 45, which form the interconnect system 40, run at substantially the same rate of speed. The function of the file distributor 10 is to make copies of each received ATM cell and immediately send one copy of each received cell to each CPU 25.

The disadvantages of this method are caused by its limitations, firstly by the limitation to use a fixed size packet protocol, such as ATM, which can be efficiently broadcast, and secondly by the requirement that all elements in the entire system, including the file server, employ interfaces running the same protocol at substantially the same speed. This restricts the selection of suitable file servers, limiting them to those with ATM interfaces. Additionally, it also puts an undue limitation on the transmission link or the network by requiring it to run at the speed consistent with the internal speed of the destination system. Another disadvantage of this method is that all CPUs must be ready to receive the transferred data simultaneously and at the same rate regardless of any other urgent tasks the CPUs may have.

Yet in another approach to the distribution of software described in Internet Engineering Task Force (IETF) document rfc2090, it has been suggested to use a multicast capable Internet Protocol (IP) router instead of the file distributor 30 to improve the efficiency of the distribution system 100.

The major disadvantages of this method include high cost of placing a multicast capable IP router into the system, and the requirement for all CPUs to become nodes on a routed IP network. This implies a great deal of complexity and cost.

Accordingly, there is a need in industry for the development of an alternative approach to the distribution of software, which would lack the above-mentioned drawbacks.

SUMMARY OF THE INVENTION

It is therefore an object of the present invention to provide a system and method for the distribution of software files, which would be simple, cost efficient and provide the distribution of software files without undue limitations imposed on the system and the receiving targets.

According to one aspect of the invention there is provided a method for distributing a software file from a source to a plurality of targets, comprising the steps of:

(a) transferring a portion of the file from the source to a file distributor having a storage medium, and storing said portion of the file in the storage medium, the size of the storage medium being less than the size of the file, but sufficient to accommodate the transferred portion of the file; and (b) forwarding said stored portion of the file from the file distributor to the targets asynchronously so that each target receives the portion of the file at its own rate.

Conveniently, the method further comprises the step of:

(c) repeating the steps (a) to (b) the required number of times until the file is received at the targets.

Advantageously, the method comprises the steps (a) to (b) which provide receiving, storing and forwarding the portion of the file in a form of packets so that one packet is sent, received and stored at a time. For example, the step (a) may comprise receiving and storing the portion of the file, which size is equal to one packet. Then, the step (b) may conveniently comprise receiving an acknowledgement from a target that the packet has been received at the target. Beneficially, the step (b) of the method further comprises:

setting a timer for a time limit for the forwarding of the portion of the file to the targets; and transferring the next packet from the source when any of the following events occurs: the acknowledgements are received from all targets, and the timer is timed-out.

Alternatively, the step (a) may comprise receiving and storing the portion of the file, whose size is greater than one packet. Then data flow control in forwarding the portion of the file from the file distributor to the targets may be performed in the following manner:

forming a list of packets stored in the storage medium, the list having a tail and a head defined so that the earliest stored packet is placed at the tail of the list, and the latest stored packet is placed at the head of the list; and for each packet, monitoring the targets, which receive the packet, and sending corresponding acknowledgements to the file distributor. For example, the step (a) may comprise transferring the next packet from the source to the file distributor, the transferring being performed when the acknowledgements from at least one target associated with the stored packet at the head of the list have been received at the file distributor, the packet at the tail of the list is being dropped respectively. Advantageously, the step (b) of the method further comprises:

setting a timer for a time limit for the forwarding of the portion of the file to the targets.

In this case the step (a) of the method conveniently comprises transferring of the next packet from the source to the file distributor, the transferring being performed when the timer is timed-out. Yet alternatively, the step (a) of the method may comprise transferring of the next packet from the source to the file distributor, the transferring being performed when any of the following events occurs: the acknowledgements, associated with all stored packets in the list, have been received from at least one target, and the timer is timed-out. When the timer is timed-out, the transfer of the next packet to the file distributor takes place even though none of the targets has acknowledged reception of the packet at the head of the list. Yet in another alternative, the step (a) of the method may comprise transferring of the next packet from the source to the file distributor, the transferring being performed when acknowledgments associated with the packet at the head of the list have been received from a predetermined number of targets. Beneficially, the step (b) of the method further comprises setting a timer for a time limit for the forwarding of the portion of the file to the targets; and wherein the step (a) comprises transferring of the next packet from the source to the file distributor, the transferring being performed when any of the following events occurs: when acknowledgments associated with the packet at the head of the list have been received from a predetermined number of targets, and the timer is timed-out.

According to another aspect of the invention there is provided a system for distributing a software file from a source to a plurality of targets, comprising:

means for transferring a portion of the file from the source to a file distributor having a storage medium for storing said portion of the file, the size of the storage medium being less than the size of the file, but sufficient to accommodate the transferred portion of the file;

the file distributor further comprising a flow mediator for forwarding said stored portion of the file from the file distributor to the targets asynchronously so that each target receives the portion of the file at its own rate.

Advantageously, the means for transferring the portion of the file and the flow mediator include means for receiving, storing and forwarding the portion of the file in a form of packets so that one packet is sent, received and stored at a time. Beneficially, the flow mediator comprises means for receiving an acknowledgement from a target to inform the flow mediator that the packet has been received at the target. Additionally, the flow mediator may comprise a timer.

According to yet another aspect of the invention there is provided a flow mediator for a system for distributing a software file from a source to a plurality of targets, comprising means for data flow control for forwarding the stored portion of the file to the targets asynchronously so that each target receives a copy of the file at its own rate. Beneficially, the means for data flow control comprises means for monitoring the targets, which have received the portion of the file, and means for transferring the next portion of the file to the file distributor in response to a signal from the means for monitoring. Conveniently, the means for data flow control further comprises a timer.

The proposed method and system for the distribution of software file has the following advantages. It allows forwarding of packets received from the source to the targets with data flow control, while buffering only a limited portion of the file, thus providing distribution of the file to the targets asynchronously so that each target receives a copy of the file at its own rate. Additionally, the file to be distributed to the targets, is downloaded from the source only once, which allows limitation of unnecessary increase of the traffic on the source domain, and acceleration of the overall transfer of the file in a situation where the link or network between the source and the file distributor performs slower than the destination system. It also requires less memory resources on the file distributor and much less frequent memory upgrades, or no memory upgrades at all.

BRIEF DESCRIPTION OF THE DRAWINGS

The invention will now be described in greater detail with reference to the attached drawings, in which.

DETAILED DESCRIPTION OF THE PREFERRED EMBODIMENTS

Figure 1:
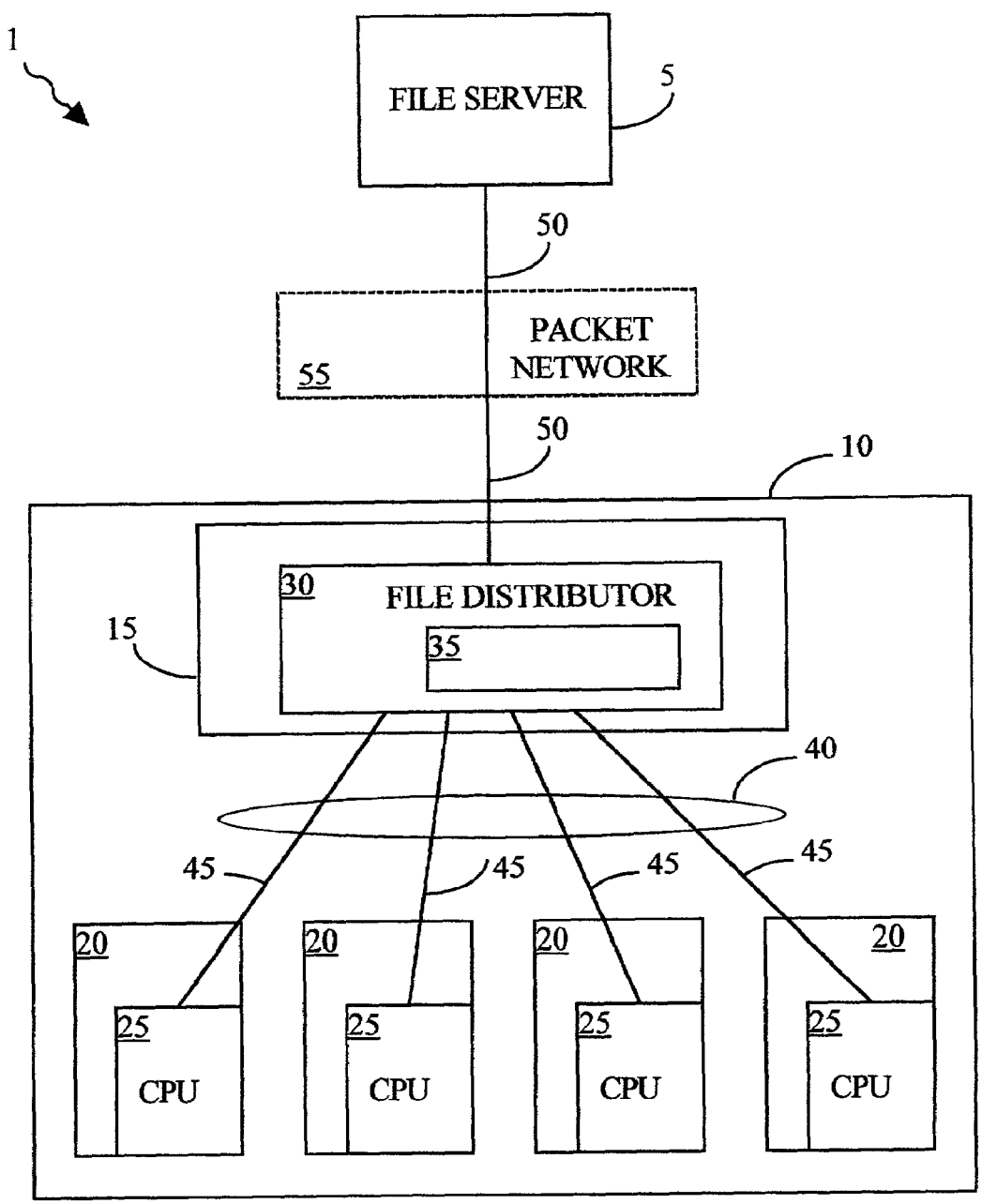
FIG. 1 is a schematic block diagram of a file distribution system according to the prior art.
Figure 2:
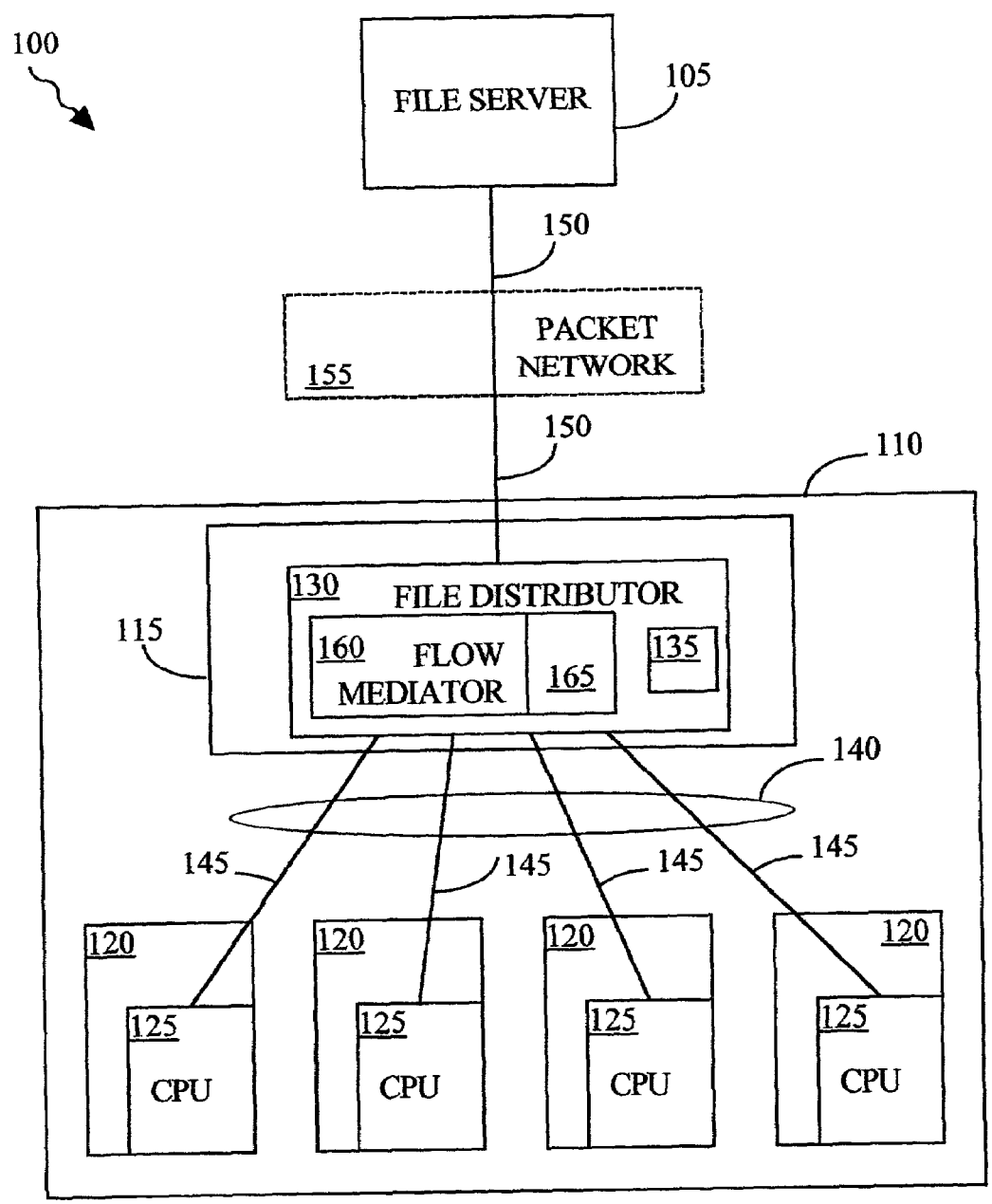
FIG. 2 is a schematic block diagram of the file distribution system according to the embodiments of the invention.

A file distribution system 100 according to the first embodiment of the invention is shown in FIG. 2. It is similar to the system shown in FIG. 1 except for the file distributor 130 now having a flow mediator 160 for data flow control during the file transfer process, and the size of the storage medium 135 being smaller than the size of the transferred file. Similar elements of the system 100 are designated by similar reference numerals shown in FIG. 2, each being incremented by 100. In more detail, the system 100 includes a source (file server) 105 which has a file to be distributed, a destination system 115 having a plurality of modules 120 having targets (CPUs) 125 for receiving copies of the file, and a file distributor 130 as a part of the destination system which has a limited storage medium 135 and a flow mediator 160 to provide data flow control during the file transfer. An interconnect system 140, being part of the destination system, includes links 145 to CPUs 125, and connection between the file server 105 and the file distributor 130 is performed via transmission link 150 or a packet network 155 as shown in FIG. 2. The system provides transfer of a portion of the file, typically one packet at a time, from the source 105 to the file distributor 130, where each of the received packets is stored in the storage medium 135 and assigned multiple tags associated with the designated CPUs, which are intended to receive a copy of the file. The flow mediator 160, which includes means for monitoring the file transfer 165, provides transfer of the stored packets to the designated targets asynchronously so that each target receives packets at its own rate. It is achieved by monitoring which targets have received the packet under consideration, including receiving acknowledgements from the targets, and requesting the next packet to be transferred from the file server 105 to the file distributor 130 in response to a signal from the means for monitoring 165. Additionally, the flow mediator includes a timer to set up a time limit for the transfer of the packet to the target.

A detailed operation of the system 100 according to the method of the invention is illustrated in FIGS. 3 to 11.

Figure 3A:
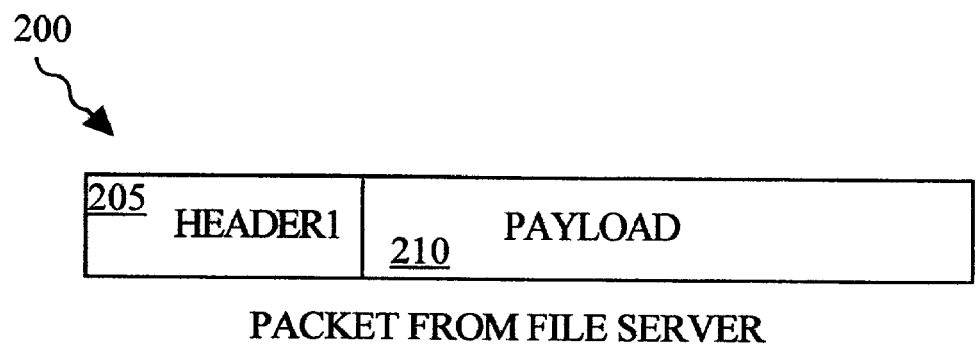
FIG. 3A is a diagram illustrating a packet format used in data transmission from the file server to the file distributor.

FIG. 3A shows a packet 200 received by the file distributor 130 from the file server 105. Each packet 200 contains a "header1" 205 and a payload 210. The "header1" 205 is adapted to operate with the transmission protocol used on link 150, or on the packet network 155. The payload 210 contains data representative of a portion of the file (not shown) that is to be conveyed from the file server 105 to the CPUs 125 through the file distributor 130.

Figure 3B:
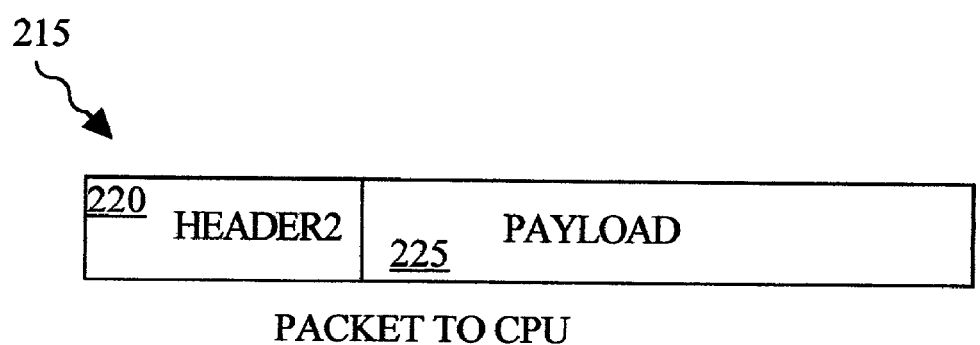
FIG. 3B is a diagram illustrating a packet format used in data transmission from the file distributor to CPUs.

Transmission of the file from the file distributor 130 to the CPUs 125 is also performed in the form of packets 215 whose structure is shown in FIG. 3B. The packet 215 has a "header2" 220 and a payload 225, wherein the "header2" 220 is adapted to be compatible with the internal protocol provided by the destination system 115 for operation over its interconnect system 140. The payload 225 of a packet 215 is an exact copy of the payload 210 of a corresponding packet 200. It means that a sequence of packets 200 arriving at the file distributor 130 from the file server 105, is transmitted to each of the CPUs 125 as a sequence of packets 215, where the payload contents of the packets are unchanged, while the "headers2" 220 are adapted to be compatible with said internal protocol of the destination system 115. Because packets 215 are essentially copies of the packets 200 (with the exception of the headers), it is possible to send the packets 215 to the CPUs 125 as soon as the corresponding packets 200 are received, thus avoiding the reassembly and storage of the entire file in the storage medium (storage memory) 135. However, this would require that both the interconnect system 140 and each of the CPUs 125 are ready to handle the resulting rate of the packet flow.

Additional types of packets, which are not illustrated, can be sent back from the CPUs 125 to the file distributor 130, to acknowledge reception of packets 215. A positive acknowledgement packet is referred to as "ACK" and a negative acknowledgement packet as "NACK".

Figure 4:
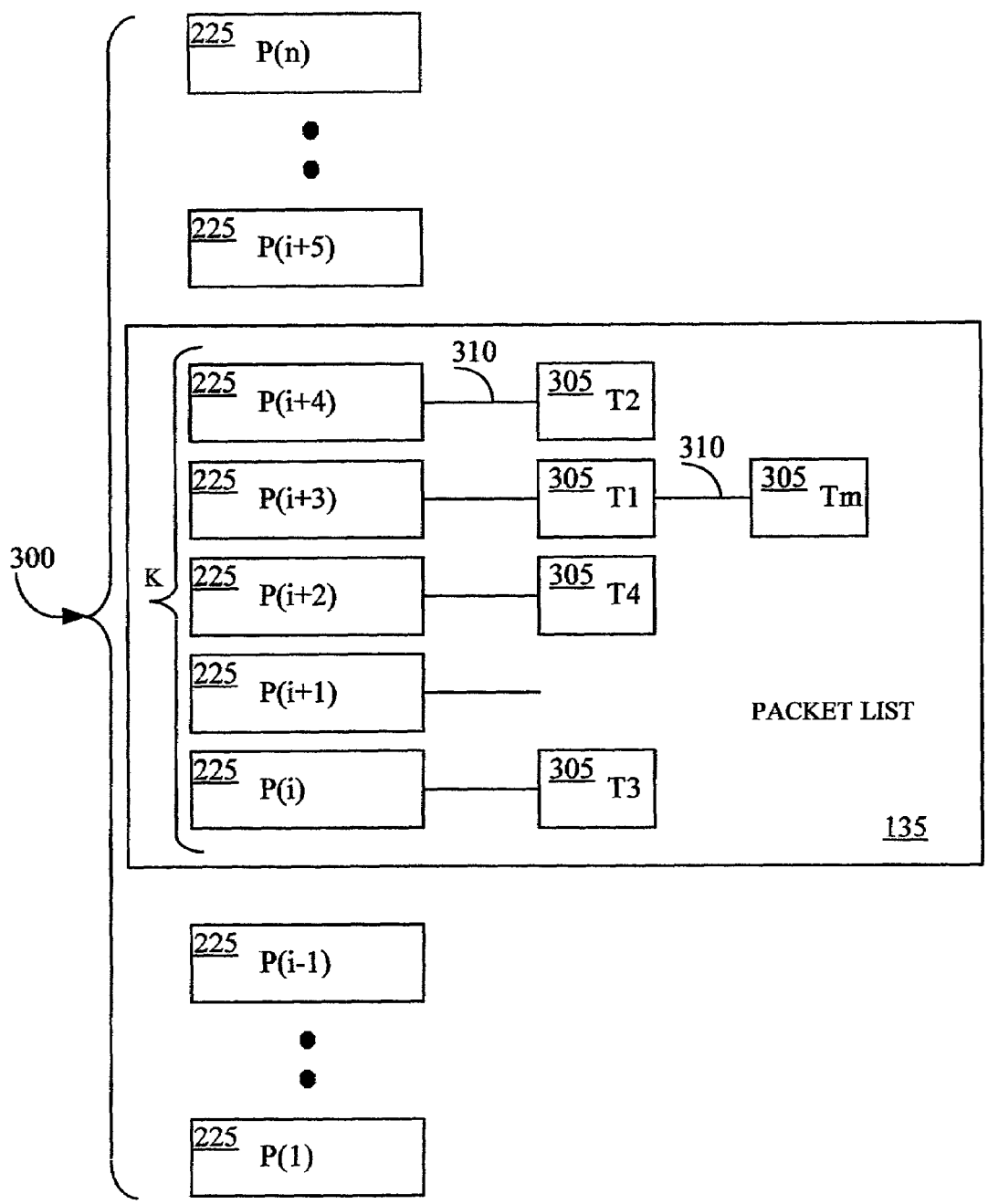
FIG. 4 is a diagram illustrating a state of flow mediator during the file transfer.

FIG. 4 shows a state of the flow mediator 160 during the file transfer where a computer file 300 is shown segmented into a series of "n" packet payloads 225, labeled P(1) to P(n). The packet payloads are the storage memory 135 of the file distributor 130, including a number of "k" of packet payloads P(i) to P(i+4)(wherein "k"=5), or generally, payloads P(i) to P(i+k−1). Each packet payload 225 is assigned a number of target tags 305, labeled T1 to Tm. Each target tag 305 may be associated with any of the packet payloads P(i) to P(i+k−1) as required. This association is shown symbolically by links 310 each of which either directly, or by way of another target tag, which links a target tag to a packet payload. In the example shown in FIG. 4, target tag T3 is associated with packet payload P(i); no target tag associated with packet payload P(i+1); target tag T4 is associated with packet payload P(i+2); target tag T1 is associated with packet payload P(i+3); target tag Tm is also associated with packet payload P(i+3); target tag T2 is associated with packet payload P(i+4). For clarity of illustration, the number "k" of packet payloads, which are stored in the storage memory 135 shown in FIG. 4, is arbitrarily chosen to be five. It is noted that any different number of "k" payloads, where "k" positive and less or equal to "n", could be selected without affecting the method of operation of the system.

The target tags 305 are matched to the specific CPUs 125, so that target tag T1 is matched to CPU #1, and generally target tag Tj is matched to CPU #j. Each CPU 125 to which the file 300 should be distributed, will have a corresponding target tag resident in the storage memory 135 during the file transfer. Again, for clarity of illustration, the number "m" of target tags shown in FIG. 4 is arbitrarily chosen to be five. It is noted that the number of target tags 305 is a function of the number of CPUs 125, which participate in the file distribution process.

FIG. 4 illustrates the state of the flow mediator 160 at an instant in time, when the transfer of the file 300 through the file distributor 130 has started, but before it is completed. Packet payloads P(1) to P(i−1) represent an earlier portion of the file 300, which have been already transferred; packet payloads P(i+5) to P(n) represent a future portion of file 300, still to be transferred, and five packet payloads P(i) to P(i+4) represent the current portion of file 300, which is stored in the storage memory 135 and being transferred at this instant in time.

Figure 5:
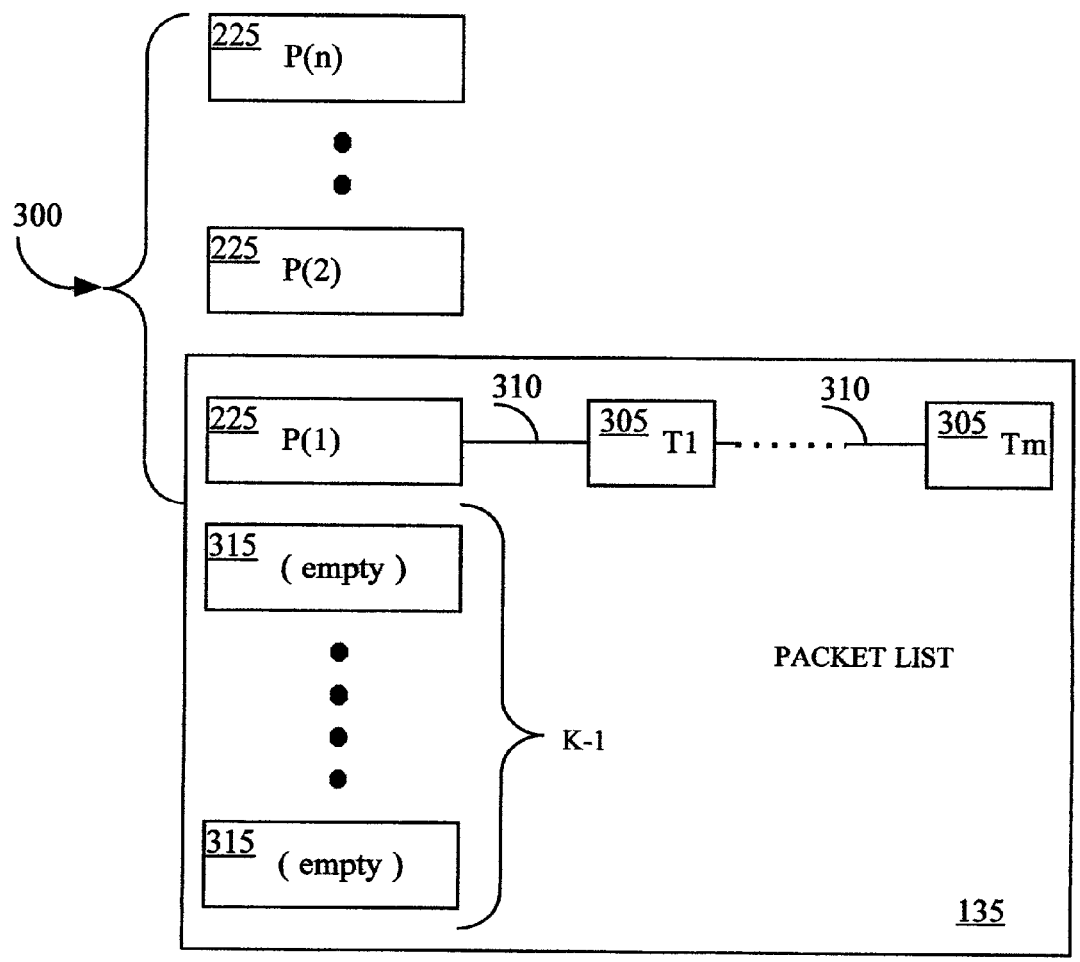
FIG. 5 is a diagram illustrating a state of flow mediator at the beginning of the file transfer.

FIG. 5 shows the state of the flow mediator 160 at the beginning of the file transfer, after the file distributor 130 has received the first packet from the file server 105. The file 300 is again represented as packet payloads P(1) to P(n). As illustrated, there is only one packet payload P(1) stored in the memory 135, and all target tags T1–Tm are associated with the packet payload P(1), as indicated by links 310. The remaining packet payloads P(2) to P(n) have not yet been received into the file distributor. FIG. 5 also shows a number "k−1" (where k=5 in the example shown) of empty packet payload spaces 315. These will be used later to store packet payloads, as the transfer of more file portions, i.e. P(2) to P(n) is performed. It should be noted that the storage memory 135 has space only for "k" packet payloads. Typically, if the number of packet payloads "n" representing the entire file 300 is such that "n" is greater than "k", the "k" packet payloads stored in the storage memory 135 are a contiguous subset of said "n" packet payloads.

The collection of packet payloads 215 and their associated target tags in FIGS. 4 and 5 will be referred to as a "packet list". The "head" of the packet list is the packet payload with the highest index value, i.e., the payload of the packet, which is most recently received from the file server 105, e.g., packet P(i+4) in FIG. 4.

Figure 6:
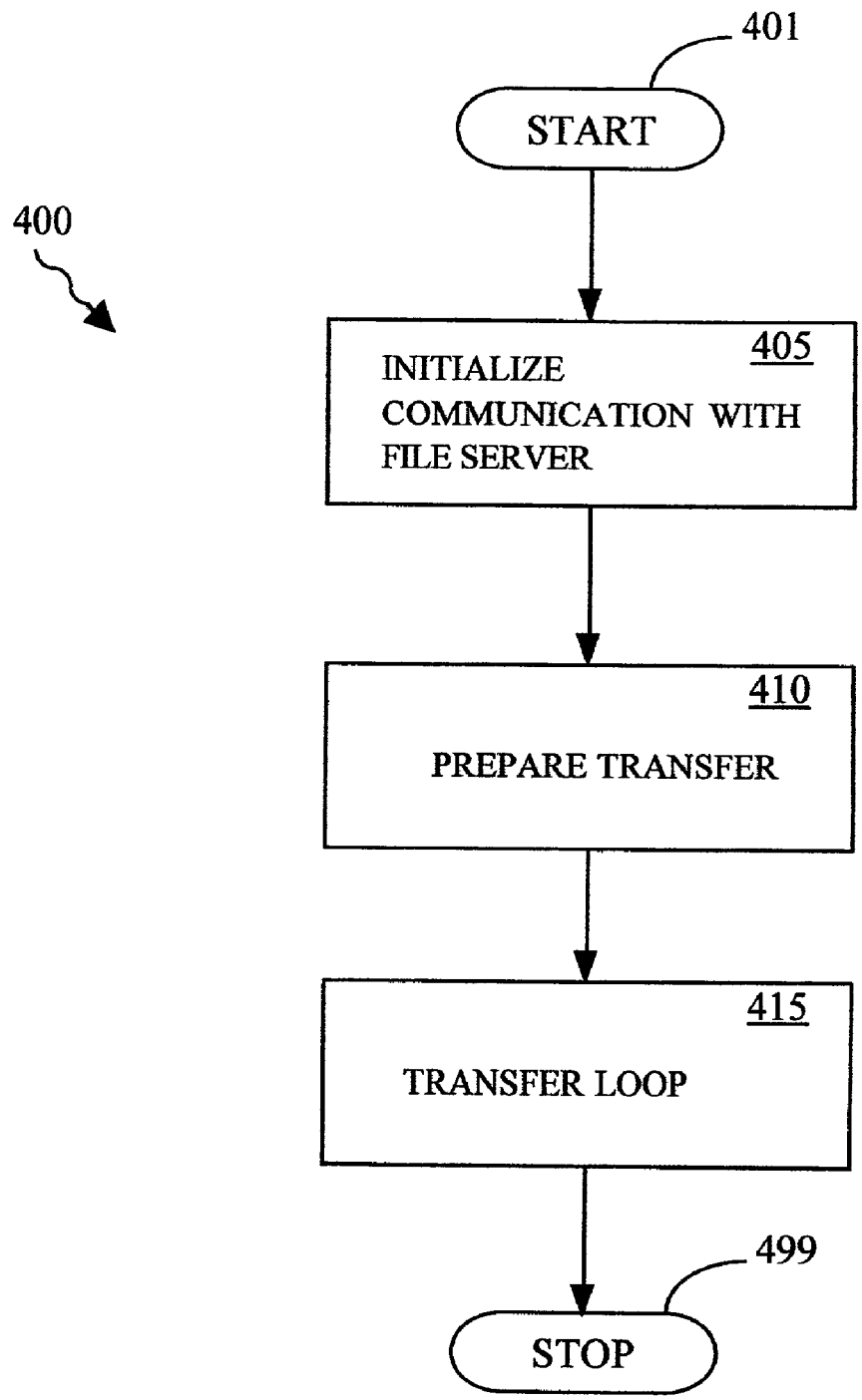
FIG. 6 is a flow chart illustrating operation of the file distributor.

An overall flow chart 400 describing operation of the file distributor 130 is shown in FIG. 6. Upon startup (block 401), the "Initialize" routine (block 405) represents the initialization of communication between the file server 105 and the file distributor 130, which is performed in a traditional manner and will not be described further. After initialization 405, the "Prepare Transfer" routine (block 410) is entered. Routine 410 represents the reception of the first packet from the file server 105 as illustrated above in FIG. 5, and after the routine 410 is completed, the transfer loop routine (block 415), which is responsible for forwarding packet payloads to CPUs 125, is entered. Routine 415 finishes its operation when all packets of the file 300 have been received at the file distributor 130, and when their packet payloads have been forwarded to all CPUs. The flow of execution then halts at the block "STOP" 499.

The process of the file transfer will now be described in greater detail with reference to FIGS. 7, 8 and 10, where each figure expands one or more blocks of FIG. 6 and includes an "ENTER" block and one or more "LEAVE" blocks. The sequence of operations between "ENTER" and "LEAVE" represents the operation shown as a single block in FIG. 6.

Figure 7:
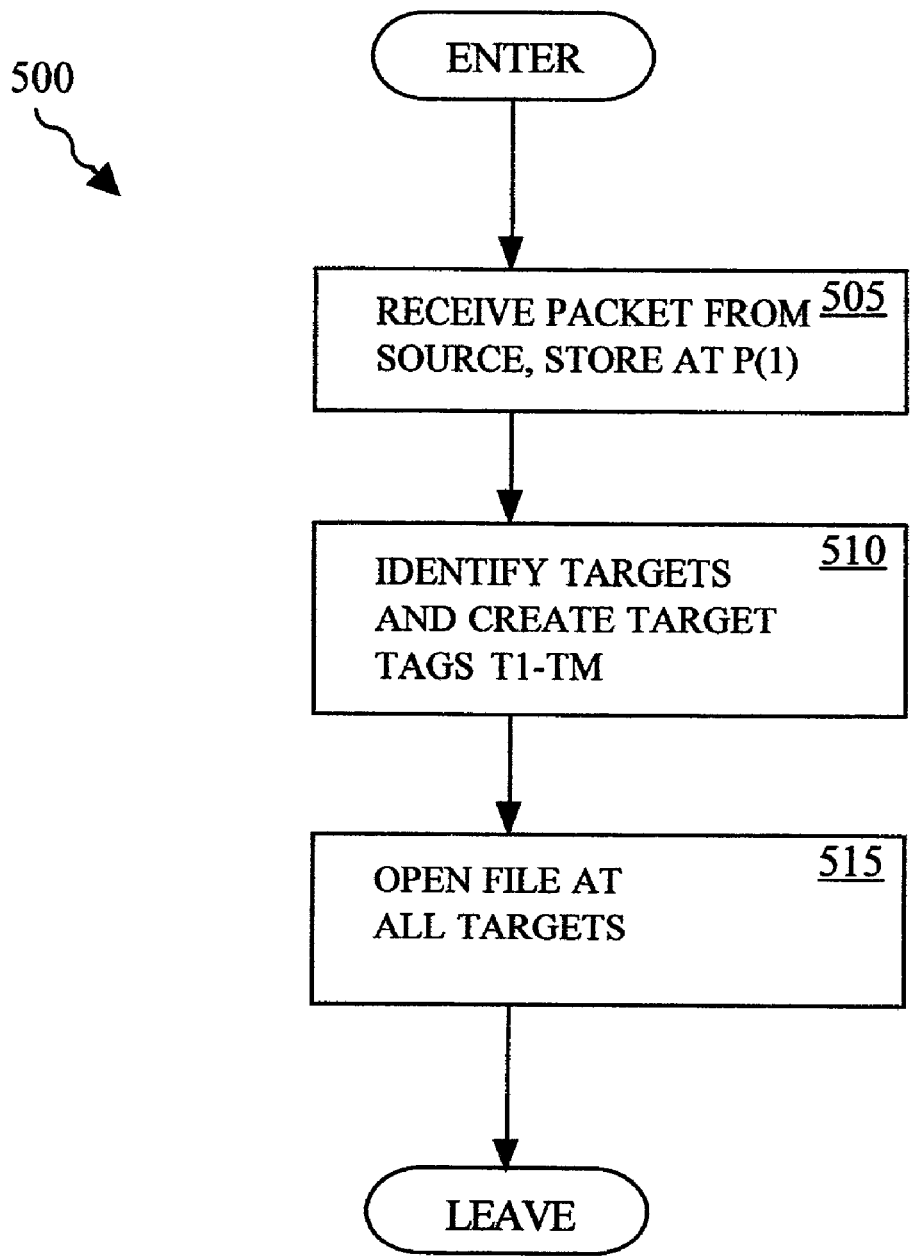
FIG. 7 is a flow chart illustrating operation of the flow mediator on preparation of the transfer in accordance with block 410 of FIG. 6.

The flow chart 500 of FIG. 7 is an expansion of the routine 410 of FIG. 6. The first step (block 505) is designed to receive the first packet from the file server 105 and store its payload in the storage memory 135 as illustrated in FIG. 5. Because this is the first payload packet, it is labeled P(1) for illustration purposes only. All CPUs 125 (CPU #1 to CPU #m), which are selected by a control system (not shown) to receive the file, are identified, and target tags T1 to Tm are being created, stored in memory, and linked to payload packet P(1) in the memory 135 (block 510). Block 515 refers to a routine which informs all targets to prepare for the reception of the file, details of which operation are specific to the interconnect system 140 and the operating system employed in the system 115. The routine 515 also sends the first packet to each target. This is done by combining, for each of the CPUs 125 identified by a target tag T1–Tm, a "header2" 220 (see FIG. 3) with a copy of the packet payload P(1), to form a packet that is then sent over the interconnect system 140 as shown in FIG. 3B.

Figure 8:
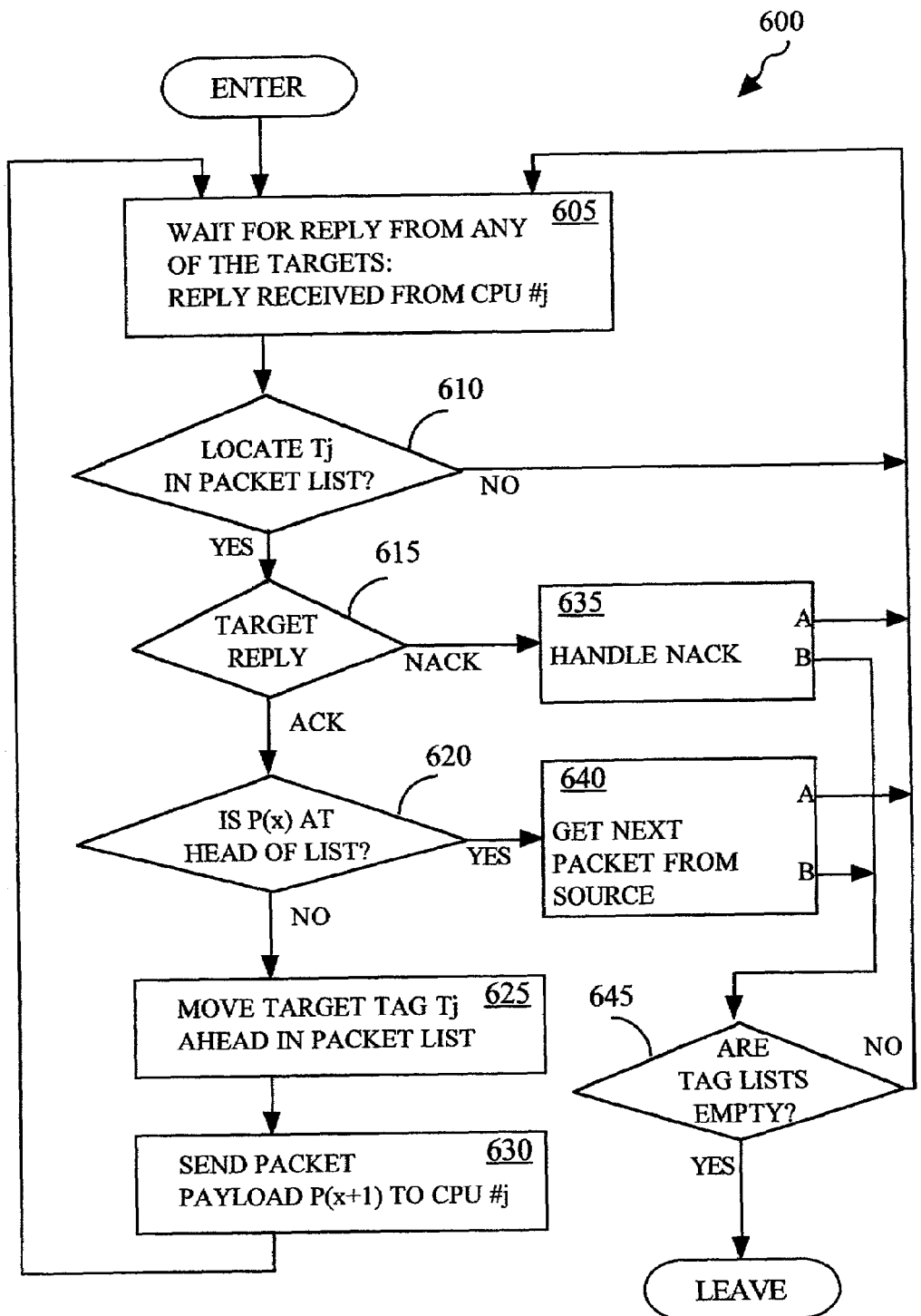
FIG. 8 is a flow chart illustrating operation of the flow mediator on processing of a transfer loop in accordance with block 415 of FIG. 6.

The flow chart 600 of FIG. 8 is an expansion of the block 415 of FIG. 6. This block represents the transfer loop of the flow mediator operation. The flow chart 600 shows a main loop of blocks from block 605 through blocks 610, 615, 620, 625, to block 630, which is executed repeatedly. The flow of execution follows a path, which depends on the results of the conditions tested in blocks 610, 615, 620, and 645. Block 635 is executed whenever it is indicated by the decision of block 615, and block 640 is executed whenever it is indicated by the decision of block 620. Both blocks 635 and 640 have two exit conditions, A and B, where exit condition A leads to a restarting of the loop at block 605, and exit condition B leads to decision block 645. The possible outcomes of decision block 645 are YES and NO. Upon a determination of said NO, the main loop is re-entered at block 605. A determination of YES at decision block 645, leads to the exit of the flowchart 600 at LEAVE, i.e. execution returns to the enclosing flow chart 400, and block 499 in FIG. 6.

The main loop 605 to 630 will now be described in more detail with reference to in FIG. 8. It has been mentioned above that following initialization (routines 405 and 410), a copy of the first packet P(1) is sent to all CPUs 125. Accordingly, block 605 instructs the flow mediator 160 to waits for a reply from the CPUs 125. The first packet may be sent to all CPUs simultaneously if the interconnect system 140 is of the bus type, having a broadcast capability, or in a sequence, first to CPU #1, then CPU #2 up to CPU #k if the interconnect system 140 does not have the broadcast capability. In either case, individual replies, indicating reception of the packet at each CPU, are received by the flow mediator 160 at different times and in a different order, essentially at random. Generally, either after the initialization (block 410) or during the file transfer (when the loop 605 to 630 has been executed at least once), a number "m" of packets have been sent to "m" CPUs, and corresponding number of "m" replies from the CPUs are expected, wherein "m" is the number of the CPUs, which take part in the file distribution process.

Block 605 then indicates the wait for, and the reception of, a reply from any one CPU (CPU #1 to CPU #m), corresponding to any of the target tags T1–Tm. Once such a reply is received, for example from CPU #j, the corresponding target tag Tj is located by searching all stored target tags in the packet list (block 610). The search made by routine 610 may fail (result of "NO") if the target tag Tj is not found. The link 310 (FIG. 4) connects the target tag with a specific packet payload P(x) to which this reply refers. A reply may be either a positive acknowledgement (ACK) indicating correct reception of the packet, or a negative acknowledgement (NACK) indicating an error. The reply is compared with the expected responses in block 615.

A reply of NACK initiates execution of block 635 ("Handle NACK") which sends the same packet P(x) again to the CPU #j that had replied with the NACK. Block 635 exits through point A, and the operation of the flow chart 600 returns to block 605. Conveniently, e.g. as it is commonly done in re-transmission protocols, a counter (within block 635) limits how many times the same packet can be re-sent. When this limit is exceeded, block 635 exits through point B after removing the target tag Tj in the packet list in the memory 135. After the target tag Tj has been removed from the packet list, CPU #j now no longer participates in the file transfer, but the file transfer to the remaining CPUs is unaffected.

When an ACK is detected, block 620 checks out if the packet payload P(x), to which the target tag Tj is being linked, is located at the head of the packet list, i.e. if the packet payload is the most recently received packet payload. If the answer is YES, it means that the responding CPU #j has successfully received the most recently received packet payload, which triggers block 640 responsible for the transfer of the next packet payload from the file server 105 to the file distributor 130. If the answer is NO, the reply from the CPU #j refers to a packet payload P(x) which is not at the head of the list. It means that the next packet payload (P(x+1)) that needs to be sent to the CPU #j is already in the memory 135 and above P(x).

By a way of example, FIG. 4 illustrates the ACK situation described above, for j=2, where CPU #2 is represented by target tag T2 which is linked by a link 310 to packet payload P(x)=P(i+4). The next packet of the sequence of packet payloads that make up the file 300 is a packet payload P(i+5), which yet has not been stored in the memory 135.

To illustrate the ACK situation, let's refer to FIG. 4 again and assume, for instance, that j=4, i.e. that CPU #4 has replied. Target tag Tj=T4 is then linked to packet payload P(x)=P(i+2). The ACK reply from CPU #4 indicates that a copy of P(i+2) has been successfully received, and CPU #4 is now ready to receive the next packet payload P(x+1)=(P(i+3)). The function of the routine of block 625 is to remove the identified target tag Tj (=T4 in this example) from packet payload P(x)=P(i+2) and attach it to packet payload P(x+1)=P(i+3). After routine 625 is performed, packet payload P(i+2) has no target tag associated with it, while P(i+3) being linked to T4, as well as to T1 and Tm. Routine 630 which follows routine 625 sends a packet with a copy of the packet payload P(x+1) now indicated by the target tag Tj, to the CPU #j associated with the target tag. Processing then continues with block 605, i.e. waiting for the next reply from any target.

Figure 9:
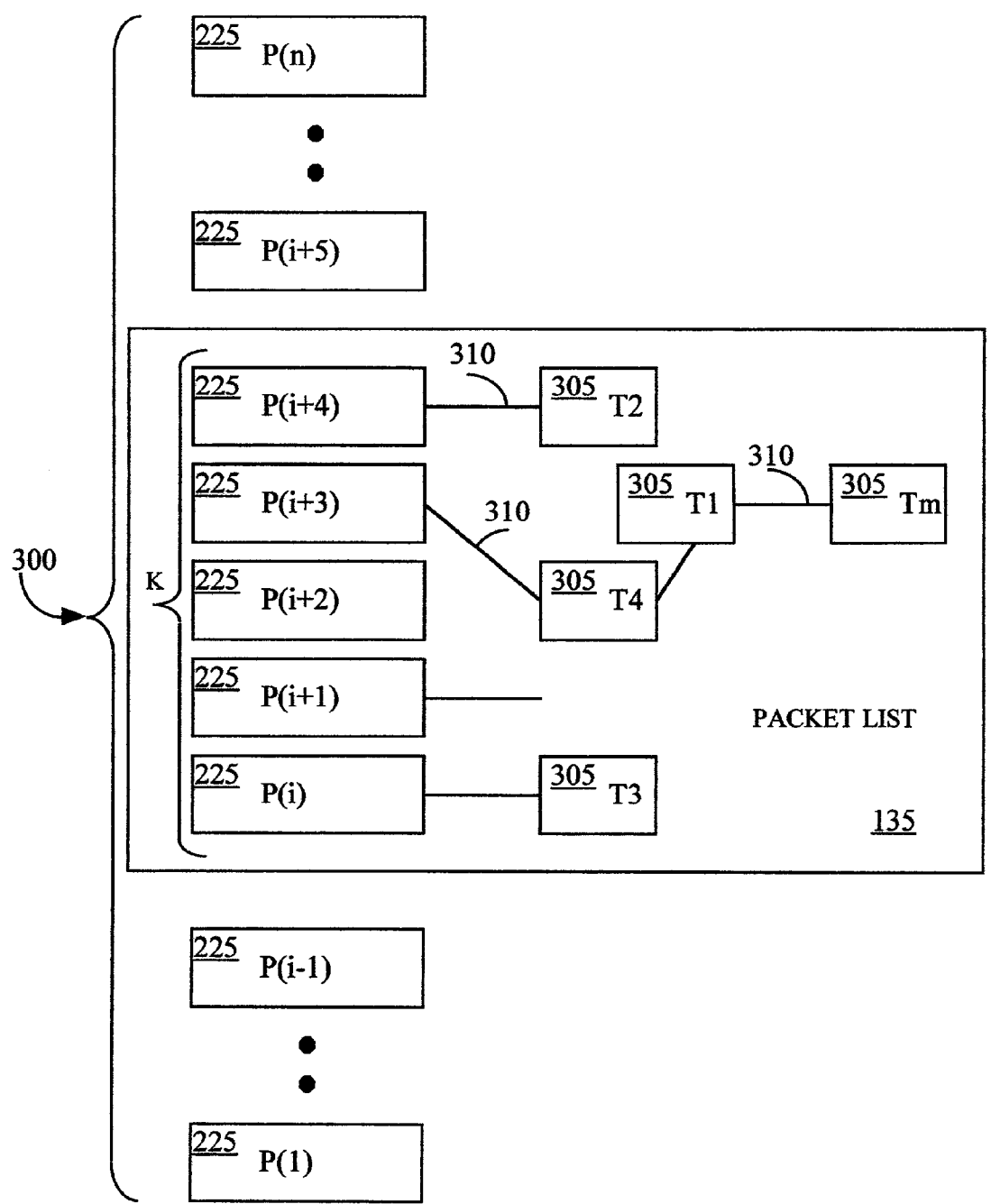
FIG. 9 is a diagram illustrating a state of flow mediator during the file transfer and after a packet in the middle of a packet list has been delivered to a CPU.

FIG. 9 illustrates the state of the flow mediator 160 at this point, starting from the state illustrated in FIG. 4, and following the reception of an ACK reply from CPU #4.

Figure 10:
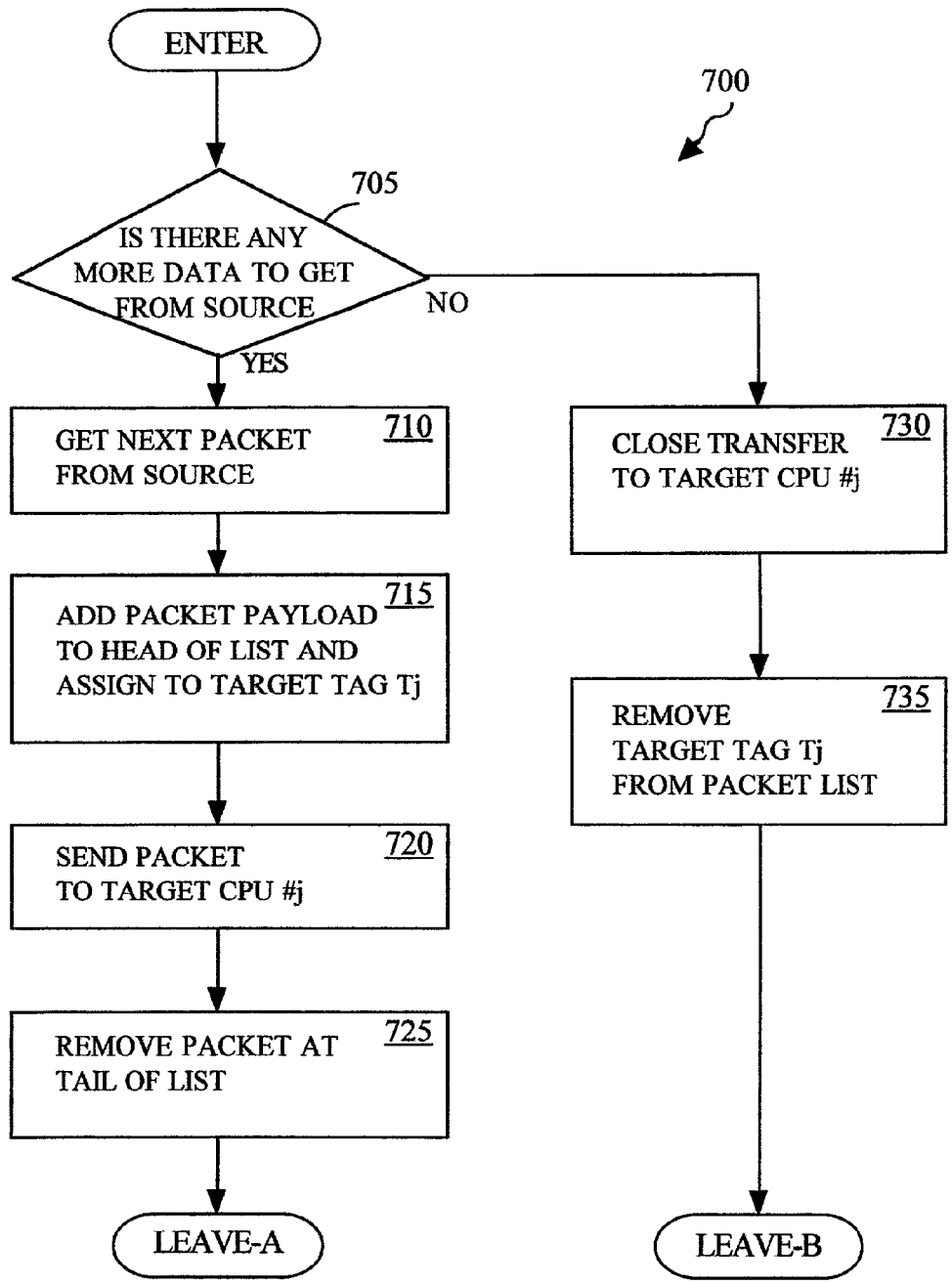
FIG. 10 is a flow chart illustrating operation of the flow mediator on receiving the next packet from the source in accordance with block 640 of FIG. 8.

FIG. 10 shows a more detailed description of block 640 ("Get next packet from source") of FIG. 8, which is expanded in the flow chart 700. In order to get the next packet from the file server 105, we must first verify if there is any more data available for the transfer, as the file may already be completely transferred (block 705). This indication is obtained from the conventional file transfer protocol running between the file server 105 and the file distributor 130. Flow chart 700 details the steps following a YES or NO response through the sequences of blocks 710–725 and 730–735 respectively, terminating the operation of the flow chart either by "LEAVE-A" corresponding to the point A of block 640 in FIG. 8, or by "LEAVE-B" corresponding to the point B of block 640.

In more detail, upon start of block 705 in FIG. 10, which verifies if the packet is available (YES from block 705), the next packet is obtained from the file server 105 (block 710), the next packet having packet payload P(i+5) in the example of FIG. 4. The routine of block 715 places this packet payload at the head of the packet list in the memory 135 and associates the target tag indicating CPU#j (T2 in FIG. 4) with the newly placed packet payload P(i+5) through a link 310. A packet containing a copy of said packet payload is then sent to CPU #j (CPU #2 in FIG. 4), as shown in routine 720. Finally, routine 725 operates so as to remove the last packet payload in the packet list. If any target tags are still linked to the removed packet payload, these are also removed, and the associated CPUs do not receive any more packets, and the file transfer to those CPUs is cancelled. If the file transfer has been canceled for CPUj, the target tag tj would not be on the packet list (block 610).

Figure 11:
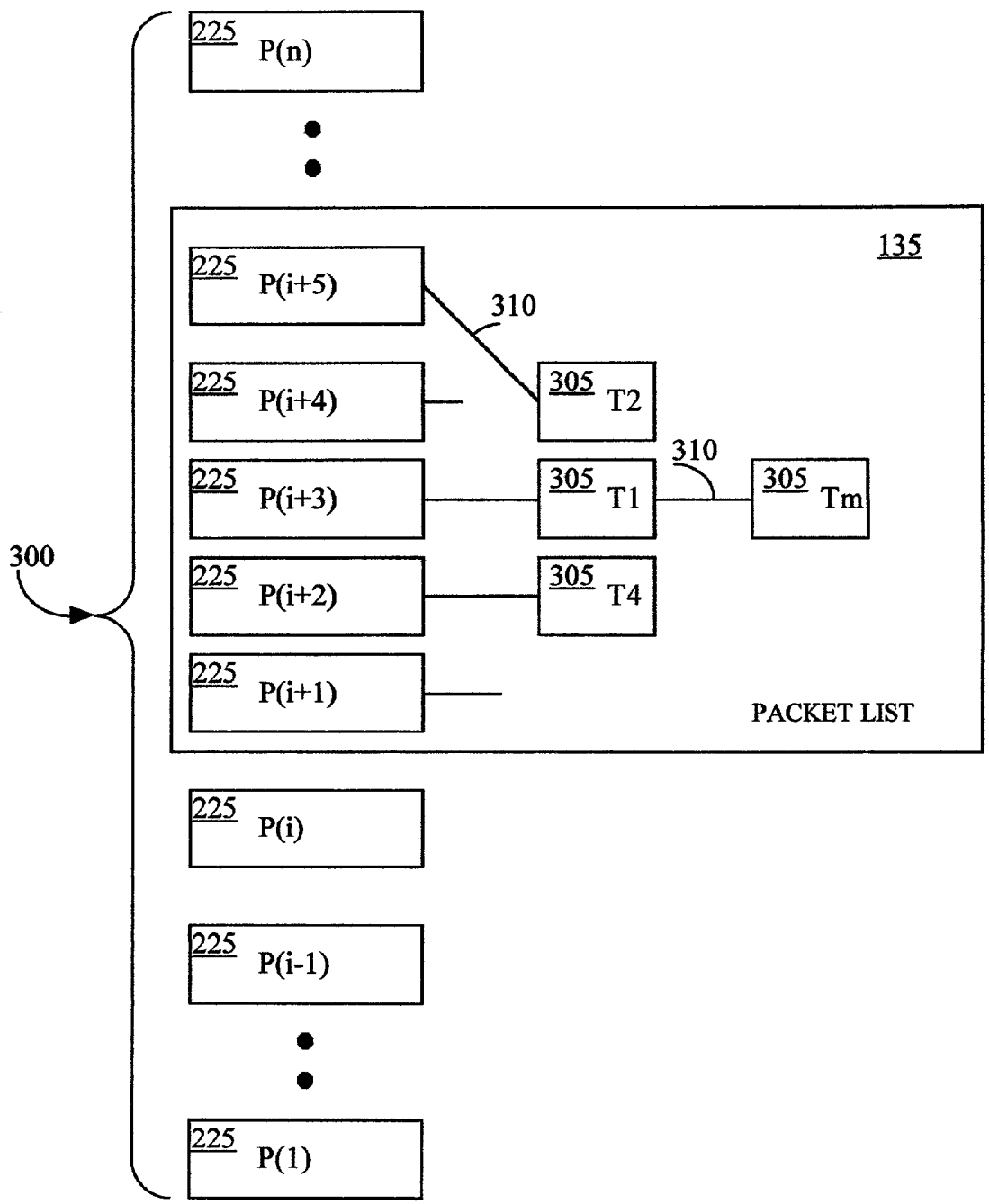
FIG. 11 is a diagram illustrating a state of flow mediator during the file transfer and after the packet at the head of the packet list has been delivered to a CPU.

FIG. 11 illustrates the state of the flow mediator 160 at this point, starting from the state illustrated in FIG. 4, and following the reception of an ACK reply from CPU #2.

If block 705 determines that there are is NO more data available from the source, the execution of the flow chart 700 continues with routines 730 and 735. The routine of block 730 informs the target CPU #j that the file transfer is complete, and the routine of block 735 removes the target tag Tj associated with the CPU #j from the file distributor's packet list.

Thus, the system and method described above enable the file distributor 130 to forward a file from a file server 105 to a number of CPUs 125 without storing the whole file in the storage memory 135 and to transfer the file to the CPUs at their own rate of data transfer. The sequence of the method steps of the first embodiment is designed to complete the entire transfer as speedily as possible, preferably being only limited by the speed of the transmission link 150 or the packet network 155 between the file server 105 and the file distributor 130.

In the first embodiment, the transfer of the file from the file server 105 to CPUs 125 is performed so that the fastest target determines the pace of the transfer, and the length of packet list determines the allowable delay before any of the other targets have their transfer cancelled. Namely, the next packet is requested from the file server as soon as the fastest CPU has acknowledged the receipt of a copy of the most recent packet payload received from the file server, as indicated in FIG. 8 (blocks 620 and 640). This mode of the file transfer would require the speed of the interconnect system 140 responsible for the transfer of the packets to individual CPUs 125, to be sufficiently high.

A system and method for the distribution of software files according to a second embodiment of the invention, are similar to that of the first embodiment except for the following features. The means for monitoring data flow control 165 of the flow mediator 160 now has a timer, which allows the flow mediator 160 to determine how long it can wait before it requests the next packet from the server (before the server times-out). The timer is set to signal the flow mediator 160 just before the server timeout interval expires. It means that the flow mediator 160 can allow as much time as it can afford for each target acknowledgement to arrive before requesting the next packet from the server. The pace of the transfer of a single packet is the lesser of the time for all targets to acknowledge the sent packet, and the timer value.

In more detail, the next packet is only immediately obtained from the server when the first CPU (of a number of CPUs) has acknowledged receipt of a copy of the latest packet payload received from the server, AND IF the oldest packet payload in the packet list is not linked to any target tags, indicating that said oldest packet has been received by all CPUs and can be removed from the packet list without affecting any file transfer. If however, any target tags are still linked to said oldest packet payload, the target tag associated with the CPU, which has acknowledged the receipt of said latest copy, is placed in a waiting list, and the next packet is not obtained from the source. A next packet will then be obtained, and a copy sent to all CPUs whose target tags are found in the waiting list, when either one of two conditions occur; (a) either all outstanding acknowledgements for said oldest packet have been received and said oldest packet payload can hence be removed from the packet list without cancellation of any transfers; or (b) the timer interrupt occurs, the timer being set to satisfy time-out requirements of the file server to file distributor protocol. In case of (b), there are still target tags associated with said oldest packet payload, and the removal of said oldest packet payload with associated target tags will result in the corresponding CPUs having their file transfers cancelled. The use of the timer and the waiting list allows the speed of the file transfer to be reduced automatically to accommodate either a moderate speed of interconnect system 140 or to serve higher number of CPUs 125. Thus, the second embodiment of the invention addresses the case where a moderate internal speed of the destination system 115, or a high number of CPUs 125 requires a less aggressive method of file distribution.

Numerous modifications can be made to the embodiments described above. For example, the transfer of the next packet from the file server 105 to the file distributor 130 can be done when one of the following events occurs: when acknowledgements associated with the packet at the head of the list have been received from a predetermined number of targets and/or when the time is timed-out. In this case it would allow to balance between the transmission speed of the network 155 and the speed of the interconnect system 140. Other arrangements for the packets transfer, which would include prioritizing of the forwarding of packets to the targets, time limits for the file server response and waiting period, and for the forwarding of the packet to the target are also possible.

The proposed method and system for the distribution of software file has the following advantages. It allows forwarding of packets received from the source to the targets with data flow control, while buffering only a limited portion of the file, thus providing distribution of the file to the targets asynchronously so that each target receives a copy of the file at its own rate. Additionally, the file to be distributed to the targets, is downloaded from the source only once, which allows to limit unnecessary increase of the traffic on the source domain, and to speed up the overall transfer of the file in a situation where the link or network between the source and the file distributor performs slower than the destination system. It also requires less memory resources on the file distributor and much less frequent memory upgrades, or no memory upgrades at all. Yet additionally it allows the accommodation of different scenarios of the file transfer determined by the speed of operation of the network 155 and the interconnect system 140 which otherwise would not be possible.

Although specific embodiments of the invention have been described in detail, it will be apparent to one skilled in the art that variations and modifications to the embodiments may be made within the scope of the following claims.

What is claimed is:

1. A method for distributing a software file from a source server to a plurality of target servers, comprising the steps of:
    (a) receiving a portion of a file from the source server at a file distributor having a storage medium, and a flow mediator;
    (b) storing the portion of the file in the storage medium on the file distributor in the form of one or more packets;
    (c) assigning multiple target tags to packets of the portion of the file stored in the storage medium, wherein each target tag identifies a target server for receiving the file, each target tags being assigned to the next packet of the portion of the file in the storage medium to be sent to the corresponding target server by the flow mediator;
    (d) transferring the stored portion of the file from the storage medium on the file distributor to the target servers asynchronously, one packet at a time, wherein each target server receives the portion of the file at its own rate; and
    (e) monitoring acknowledgements of each packet received from the target servers by the flow mediator, including removing the target tag corresponding to each target server from the packet for which the acknowledgements has been received, and reassigning it to the next packet to be sent to the corresponding target server.

2. The method as described in claim 1, further comprising repeating the steps (a) to (f) the required number of times until the file is received at the target servers.

3. The method as described in claim 1, wherein the step (a) comprises receiving a portion of a file from the source server at a file distributor having a storage medium of smaller size than the size of the file.

4. The method as described in claim 3, wherein the steps (b) and (c) further comprise:
    forming a list of packets stored in the storage medium, the list of packets having a tail and a head defined for placing the earliest stored packet at the tail of the list, and the latest stored packet at the head of the list.

5. The method as described in claim 4, wherein the step (a) further comprises receiving a next portion of the file from the source server at the file distributor, when the acknowledgements has been received at the file distributor from at least one target server corresponding to the target tag that is currently assigned to the packet stored at the head of the list.

6. The method as described in claim 4, wherein the step (a) further comprises setting a timer for a time limit for the transferring the of the portion of the file to the target servers.

7. The method as described in claim 4, wherein the step (a) further comprises setting a timer and receiving a next portion of the file from the source server by the file distributor when the timer is timed-out.

8. The method as described in claim 7, wherein the step of receiving a next portion of the file further comprises receiving the next packet from the source server by the file distributor when no target tag is currently assigned to the packet stored at the tail of the list.

9. The method as described in claim 4, wherein the step (a) comprises receiving the next packet from the source server by the file distributor when acknowledgments associated with the packet at the head of the list of packets have been received from a predetermined number of target servers.

10. The method as described in claim 8, wherein the step (a) of receiving a next portion of the file from the source server by the file distributor when the timer is timed-out further comprises dropping the packet at the tail of the packet list.

* * * * *